United States Patent [19]
Grangaard et al.

[11] 3,801,858

[45] Apr. 2, 1974

[54] DIRECT DRAW AMPLIFIER FOR MAGNETIC DEFLECTION CATHODE RAY TUBES

[75] Inventors: Orrin H. Grangaard; Ernest R. Peake, both of St. Paul, Minn.

[73] Assignee: Environmental Research Corporation, St. Paul, Minn.

[22] Filed: Oct. 10, 1972

[21] Appl. No.: 296,161

[52] U.S. Cl. ............... 315/27 TD, 330/84, 330/124

[51] Int. Cl. ............... H01j 29/70

[58] Field of Search ............... 315/27–29, 315/27 TD, 27 R

[56] References Cited

UNITED STATES PATENTS

| | | | |
|---|---|---|---|
| 3,488,551 | 1/1970 | Bryden | 315/27 TD |
| 3,628,083 | 12/1971 | Holmes | 315/27 TD |

*Primary Examiner*—Maynard R. Wilbur
*Assistant Examiner*—J. M. Potenza
*Attorney, Agent, or Firm*—Merchant, Gould, Smith & Edell

[57] ABSTRACT

A high efficiency composite amplifier circuit having a low voltage amplifier section and a high voltage amplifier section. Input signals are fed through the high voltage amplifier and also through a high current gain path to the low voltage amplifier section. When relatively low power output signals are required, the low voltage amplifier section delivers the needed power, thereby conserving power that would otherwise be dissipated in the output transistors of the high voltage amplifier. When high power output signals are required, the low voltage amplifier section saturates and the high voltage amplifier section automatically supplies the additional required power output. An inner loop and an optional outer loop feedback may be used to smooth the output signal.

10 Claims, 3 Drawing Figures

DIRECT DRAW AMPLIFIER FOR MAGNETIC DEFLECTION CATHODE RAY TUBES

BACKGROUND OF THE INVENTION

This invention relates generally to the field of electronic amplifiers, and more specifically to the field of high efficiency amplifier circuits for use in applications wherein it is desired to avoid large power dissipation by the amplifier's output stages during small signal operation.

In many practical applications in electronic devices, a requirement exists for an electronic amplifier which is able to deliver relatively high voltage high power outputs during part of its operation, but which is only required to deliver relatively low power or low voltage output during another, rather appreciable, portion of its operation. Such a requirement occurs, for example, in the design of deflection amplifiers for electromagnetically deflected cathode ray tubes. Because the deflection coil, or yoke, represents a highly inductive load, it is necessary to supply high voltage signals to the coil in order to obtain desired deflection current when rapid deflections of the electron beam are required. Thus it is necessary to design the deflection amplifier output stages to operate from power supplies having voltage high enough to provide sufficient yoke deflection current when high frequency deflections are desired. However, when only low frequency or steady state deflections of the electron beam are required, only fairly low voltage signals are required at the deflection yoke to produce the required deflection current. This means that the bulk of the high voltage from the high voltage sources would appear across the output transistors causing a great dissipation of power in the output transistors. This dissipation is undesirable both because of the high demands on the power supply and also because of severe heating problems in the output transistors.

Many proposals have been made in the prior art for solutions to these problems. One prior art solution is to use one amplifier connected to a high voltage power supply, and a second amplifier connected to a low voltage power supply. A voltage sensing switch is then used to apply the input signal to one or the other amplifier, depending upon the magnitude of the signal. Another prior art circuit uses a single output amplifier, but has both low voltage and high voltage power supplies. A voltage comparator circuit is used to switch the high voltage power supply in and the low voltage power supply out when the magnitude of the output signal approaches the limits of the low voltage power supply.

A major shortcoming of these two prior art circuits is that the switching function (i. e. the switching of the input signal from the low to the high power amplifier in the one case, and the switching from the low to the high voltage power supply in the other case) is a function of the magnitude of the composite applied waveform, and is therefore unable to respond separately to the high and low voltage components of the waveform. In other words, the voltage comparator which performs the switching function in the prior art circuits described above responds only to whatever the amplitude of the input waveform may be, without regard to the fact that the waveform may be a composite made up of high and low voltage frequency components. For example, in a cathode ray tube display for use in a digital data display, it is often necessary to move the beam at a relatively low speed to a location on the face of the tube, and then nominally hold it at that location while an alphanumeric character is painted on the face of the tube. It will be appreciated that the signal required to hold the beam at a nominal location involves a DC signal of relatively low voltage, while the painting of the character involves high frequency signals which must be of high voltage since the yoke is primarily an inductive load. Accordingly, the waveform applied to the deflection amplifier comprises a large AC signal offset from zero by a DC signal. In the prior art circuits, the voltage sensing switches respond to the compound wave form in which the AC component predominates in magnitude, and therefore switch in the high power amplifiers/high voltage supplies which must then provide both the AC component and the superimposed DC component.

The present invention provides increased efficiency in this and similar situations because it provides a low power amplifier section which can supply the low frequency and DC components of a complex applied waveform at the same time that its high power amplifier section is supplying the high frequency AC components. Thus, greater efficiency is achieved because the high power amplifier section is not required to supply the low frequency and DC components of the complex waveform.

SUMMARY OF THE INVENTION

According to the present invention there is provided an improved high efficiency composite amplifier circuit having a high power amplifier section and a low power amplifier section both connected to deliver power to an output terminal. Input signals are continuously applied to both the high and low power amplifier circuits, with the input signals being applied to the low power amplifier section through a higher gain path so that low power output signals are primarily supplied by the low power amplifier section while the high power amplifier section applies the portions of the output signal which exceed the power capabilities of a low power section.

DESCRIPTION OF THE PREFERRED EMBODIMENT

Figure 1:
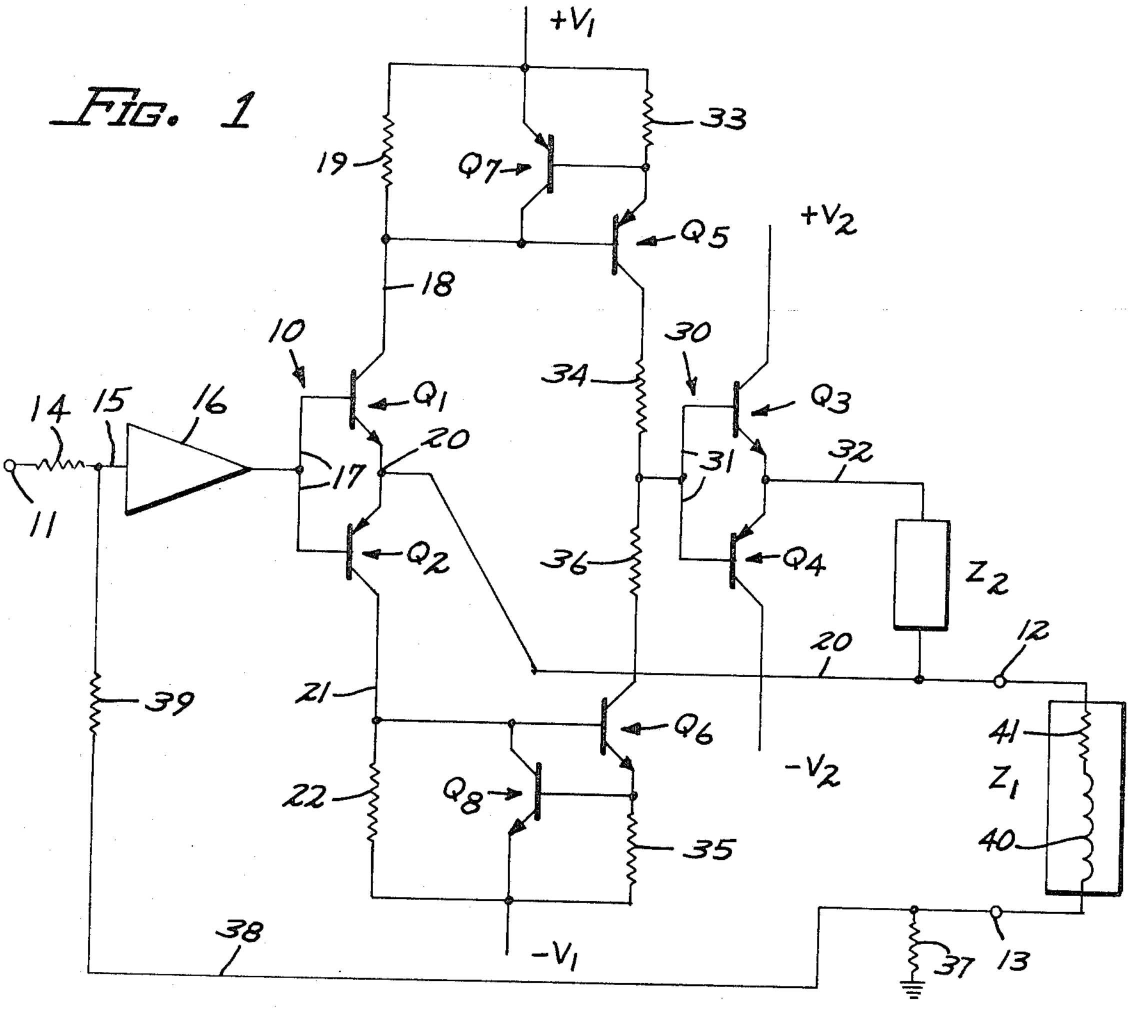
FIG. 1 is a circuit diagram of a composite amplifier according to the present invention.

The high efficiency power amplifier of FIG. 1 comprises a high power amplifier section 10 and a low power amplifier section 30. Input signals to the amplifier are applied to input terminal 11, and output signals from the amplifier are taken across terminals 12 and 13. Input signals from input terminal 11 are applied through an input resistor 14 to the inverting input 15 of a high gain preamplifier 16. The output from voltage amplifier 16 is fed by lead 17 to the bases of a pair of transistors Q1 and Q2 of the high power amplifier section 10. Q1 is an NPN transistor, whose collector is connected through lead 18 and resistor 19 to a positive high voltage supply $+V_1$. The emitter of transistor Q1 is connected by lead 20 to the emitter of transistor Q2, which is a PNP transistor. The collector of transistor Q2 is connected by lead 21 and resistor 22 to a negative high voltage supply $-V_1$.

Low power amplifier section 30 comprises an NPN transistor Q3 and a PNP transistor Q4. The bases of transistors Q3 and Q4 are connected together by lead 31. The emitters of transistors Q3 and Q4 are tied together by lead 32, which also connects to one terminal of impedence $Z_2$. The other side of impedence $Z_2$ connects to lead 20 and to output terminal 12. The collectors of transistors Q3 and Q4 are connected respectively to positive and negative low voltage sources $+V_2$ and $-V_2$.

Input signals are applied to the low power amplifier section 30 as follows. Lead 18 connects from the collector of transistor Q1 to the base of a PNP transistor Q5. The emitter of transistor Q5 connects through a resistor 33 to voltage supply $+V_1$. Another PNP transistor Q7 is provided with its emitter connected to voltage supply $+V_1$, its base connected to the emitter of transistor Q5, and its collector connected to the base of transistor Q5 by lead 18. The collector of transistor Q5 connects through resistor 34 to lead 31, and thence to the bases of transistors Q3 and Q4. On the negative side of the circuit, transistors Q6 and Q8 are the compliment of the circuitry just described. NPN transistor Q6 has its base connected to lead 21, its emitter connected through a resistor 35 to voltage supply $-V_1$, and its collector connected through a resistor 36 to lead 31. The emitter of NPN transistor Q8 is connected to voltage supply $-V_1$, the base of transistor Q8 is connected to the emitter of transistor Q6, and the collector of transistor Q8 is connected to the emitter of transistor Q6, and the collector of transistor Q8 is connected to lead 21.

A load $Z_1$ is shown connected across output terminals 12 and 13 of the amplifier. As previously mentioned, one important application of an amplifier according to the present invention is used in a deflection amplifier for a cathode ray tube. Accordingly, load impedence $Z_1$ may represent a deflection coil, or yoke, for a cathode ray tube. The impedence of the yoke can be represented by a large inductance 40, in series with a relatively small resistance 41. The path from output terminal 13 to signal ground is completed through current sensing resistor 37. Resistor 37 is relatively small in value, and functions to provide a voltage proportional to the current through the load $Z_1$. This voltage is fed back via lead 38 and scaling resistor 39 to input 15 of voltage amplifier 16, where it is summed against the input signal.

The operation of the amplifier of FIG. 1 will now be explained. As previously mentioned, the load $Z_1$ may represent the yoke of a cathode ray tube. Accordingly, it is necessary to supply an output current through $Z_1$ that is proportional to the input voltage applied to terminal 11. This proportional current characteristic is achieved in the usual manner through the use of a feedback voltage proportional to the yoke current. Because the yoke is a rather high inductance, it is necessary to apply higher output voltages at terminal 12 for high frequency signals than for low frequency signals, in order to maintain the same current in the yoke for each. The composite amplifier according to the present invention supplies the low frequency signals to the output from the low power amplifier section 30, and the high frequency signals are supplied by high power amplifier section 10.

Assume that a negative input voltage is applied to terminal 11. This signal will be inverted and amplified by preamplifier 16, and a positive voltage will appear on lead 17 at the base of transistor Q1, causing it to begin to conduct. As current begins to flow through transistor Q1, resistor 19 begins to drop the voltage at lead 18 below $+V_1$, causing transistor Q5 to begin to conduct also. Current begins to flow from power supply $+V_1$, through resistor 33, transistor Q5, resistor 34, through the base-emitter junction of transistor Q3, and then through impedences $Z_2$ and $Z_1$ and resistor 37 to ground. The base current thus supplied to transistor Q3 causes it to conduct so as to deliver power from power supply $+V_2$ through $Z_2$ to the load $Z_1$. The function of transistor Q7 will be explained in a subsequent paragraph.

It will be appreciated that a small amount of current will also be delivered to output impedence $Z_1$ through the transistor Q1, since it is in its conductive region. However, for the assumed small input signal, transistor Q3 is capable of supplying the entire required output from voltage supply $+V_2$, consequently transistor Q1 conducts only an extremely small amount of current. This follows from the fact that the signal path through transistor Q1, Q5, to the base transistor Q3 is actually a high current gain amplifier. Therefore, for the assumed small signal input, transistor Q1 only has to turn on enough to supply a small amount of base current to transistor Q5, which in turn only has to supply the required amount of base current to transistor Q3. As soon as transistor Q3 is supplying sufficient power through the load $Z_1$ as required by the input signal, the feedback condition sensed through lead 38 is satisfied. Thus, for a small signal input, transistor Q3 which is fed from the low voltage source supplies substantially all of the required output power, and the desired object of avoiding unnecessary dissipation of power through the high power output transistor Q1 is achieved.

The circuit shown in FIG. 1 is a symmetrical, or complementary circuit in that the positive half of the circuit including transistors Q1, Q3, Q5, and Q7 is the complement of the negative half of the circuit which includes transistors Q2, Q4, Q6 and Q8. For the example of a negative input signal as discussed above, transistors Q1, Q3, and Q5 are in conduction, while transistors Q2, Q4 and Q6 are off. For an input signal of the opposite polarity, transistors Q1, Q3 and Q5 would be off, while transistors Q2, Q4 and Q6 would be conducting in the same manner as previously explained for the positive half of the circuit. For AC input signals, the positive half of the circuit supplies the output signal during one half of the cycle, while the negative half of the circuit supplies the other half of the cycle.

The operation of the circuit of FIG. 1 will now be explained for input signals requiring a larger output signal than can be provided by the low power amplifier section 30 alone. This condition could occur for example if a high frequency signal were applied to input terminal 11. Since the yoke $Z_1$ is highly inductive, the output voltage at terminal 12 must be proportional to the input signal frequency, in order to achieve an output current that is proportional to the input signal amplitude. Thus, for a high frequency signal a high voltage output is required, which may exceed $\pm V_2$. When this happens, the high power amplifier section 10 automatically takes over to deliver output voltages up to $\pm V_1$ to the load. For example, assume that the high frequency input signal at terminal 11 is increasing in a negative direction. Transistors Q1, Q5 and Q3 then begin to conduct, as previously explained. However, for the high frequency signals, the back EMF produced by the deflection yoke tends to prevent the required amount of current to pass through the yoke. Thus, the feedback condition would not be satisfied, causing preamplifier 16 to increase its output. Transistors Q1 and Q5 would increase their conduction currents until transistor Q3 was completely saturated, placing substantially all of the voltage $V_2$ on lead 32. Since this voltage is not enough, for the assumed input condition, preamplifier 16 would increase its output further until transistor Q1 would for the first time begin to conduct a significant amount of current, thus putting the required high voltage to the deflection yoke.

During the time that transistor Q1 is conducting significant amounts of current, transistor Q7 functions to protect transistor Q5. As the voltage drop across resistor 19 applies a forward bias to the base-emitter junction of transistor Q5, excessive base currents could be drawn thereby damaging transistor Q5. However, to protect this transistor, the voltage drop across resistor 33 is used to turn on transistor Q7 so that the current supplied to the collector of transistor Q1 will be drawn through the emitter collector circuit of transistor Q7, rather than through the base of transistor Q5.

Selection of the value for $Z_2$ is made to be consistent with two circuit requirements. $Z_2$ should be small enough so that very little power delivered from the low power amplifier 30 to the output would be lost, and it should be large enough to provide isolation between the high and low power amplifiers so that power from high power amplifier section 10 is not lost through $Z_2$ and low power amplifier section 30 to ground. In one successful application of this invention, an impedence equal to four times the value of $Z_1$ has been used for $Z_2$. Other values of $Z_2$ could be used for other applications, for example, if the circuit were adapted to drive something other than an inductive load. With $Z_2$ equal to several times $Z_1$, $Z_2$ represents a very small impedence to the output of low power amplifier section 30, since its output consists of only DC and relatively low frequency components. However, $Z_2$ represents a relatively high impedence to the output of high power amplifier section 10, since that section's output consists primarily of high frequency components. Thus, power losses through $Z_2$ are kept to a minimum.

For applications requiring very large amounts of output current, the circuit may be modified by substituting power Darlington pairs for each of transistors Q1, Q2, Q3, and Q4. This modification will provide higher gain for the circuit, but the basic theory of operation will remain unchanged.

Figure 2:
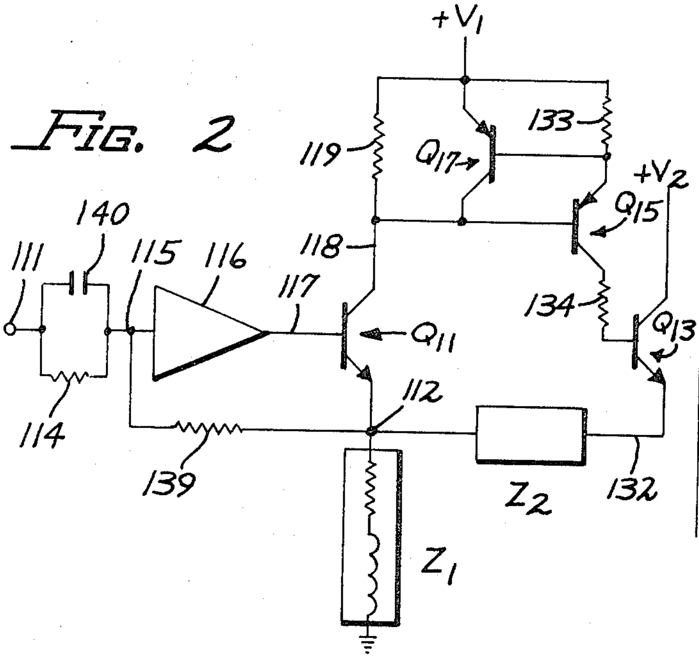
FIG. 2 is a circuit diagram of an alternate embodiment of the present invention.

The alternate embodiment of the present invention shown in FIG. 2 differs from the embodiment of FIG. 1 in several ways. The amplifier of FIG. 2 is single mode in that it can only deliver positive voltages to the load impedence $Z_1$, as opposed to the complementary circuit of FIG. 1 which can deliver both positive and negative voltages. Of course FIG. 2 could easily be modified to deliver negative voltages also by the addition of negative power supply operated circuits as in FIG. 1. In FIG. 2, transistor Q11 is the high power output transistor Q1 in FIG. 1. Similarly, transistor Q13 is the low power output transistor and corresponds to transistor Q3 of FIG. 1. Transistors Q15 and Q17 perform the same function that transistors Q5 and Q7 do in FIG. 1. Likewise, high gain preamplifier 116, resistors 119, 133, and 134 and impedences $Z_1$ and $Z_2$ all correspond in function and manner of connection to the components in FIG. 1 having corresponding reference numerals.

The principal difference between the circuits of FIG. 2 and FIG. 1 is that FIG. 2 uses voltage feedback rather than current feedback. In FIG. 2, the feedback signal applied to the input of preamplifier 116 is obtained from the output terminal 112, and applied through resistor 139 to the voltage amplifier input 115. Thus, the feedback senses the voltage applied to load impedence $Z_1$, which of course is not proportional to the current because $Z_1$ is highly inductive. When voltage feedback is used, it is necessary to tailor the overall frequency response of the amplifier so as to provide an output voltage at terminal 112 which increases as a function of frequency, so that the current through impedence $Z_1$ will be independent of frequency. Frequency tailoring is accomplished by placing capacitor 140 in parallel with resistor 114 between input terminal 111 and the input 115 to the voltage amplifier 116. Capacitor 140 provides an input impedence which decreases with frequency, so that the voltage gain of the circuit achieves the desired characteristic.

In all other respects the circuit of FIG. 2 operates in the same manner as FIG. 1. Briefly, transistor Q13 provides the DC and low frequency components to the output, while transistor Q11 supplies the high frequency components. It will be appreciated that the voltage feedback method could be used with the plus and minus complementary circuit of FIG. 1, and that the current sensing feedback method could be used with the single mode, positive voltages only, configuration of FIG. 2. For some applications, depending upon the nature of the load impedence, and the degree of linearity required, it is possible to design a circuit according to the present invention without an outer feedback loop. If so, the gain of preamplifier 16 of FIG. 1 or 116 of FIG. 2 would be reduced, and the feedback path through resistor 39 of FIG. 1 or resistor 139 of FIG. 2 would be eliminated. It will be appreciated that a degree of stability is inherently provided through the inner loop negative feedback path from the emitters of transistors Q3 and Q4 of the low power amplifier section, through impedence $Z_2$, to the emitters of transistors Q1 and Q2 of the high power amplifier section.

Figure 3:
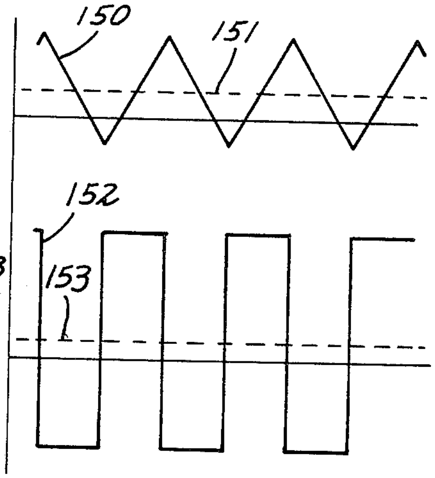
FIG. 3 is a graph of wave forms showing the operation of an amplifier according to the present invention.

The waveforms of FIG. 3 illustrate the operation of the circuit of FIG. 1 under typical conditions. Waveform 150 represents a voltage applied to input terminal 11 of FIG. 2, wherein the vertical axis represents voltage and the horizontal axis represents time. This input waveform is a compound signal resulting from the summation of an AC triangular wave and a DC voltage. The DC offset component is indicated by dotted line 151. A complex waveform sucha as 150 may be required where it is desired for the electron beam to scan out a pattern centered about a point which is offset from the center of the face of the cathode ray tube. Wave form 152 represents the corresponding output voltage waveform produced at output terminal 12. It comprises a square wave offset by a DC component indicated by dashed line 153. Since the plus and minus swings of wave form 152 exceed $\pm V_2$, it is necessary for the high power amplifier section 10 to provide power. However, the DC offset voltage will be provided by low power amplifier section 30 as has been previously described, reducing the amount of current which would otherwise be supplied through the high voltage transistors Q1 and Q2. Thus, less power is dissipated, and greater efficiency is achieved.

It is apparent that the present invention is not limited to an amplifier having only two power sections. For example, it is possible to construct a composite amplifier having a high power section operated by a high voltage power supply $V_1$, an intermediate power section operated by an intermediate voltage supply $V_2$, and a low power amplifier section operated by a low voltage power supply $V_3$. For such a three sectioned amplifier, input signals would be supplied to the third amplifier section via a high current gain amplifier connected to the collector of the output transistor for the intermediate power amplifier. The output of the third amplifier section would be connected to the load through a third impedence which would preferably be a multiple of $Z_2$. A three section composite amplifier could provide even greater power savings in certain applications by providing DC and low frequency components from the low voltage supply, intermediate frequency components from the intermediate voltage supply, and high frequency, high power signals from the high voltage supply.

I claim as my invention:

1. A composite power amplifier circuit comprising:
   a. a low power amplifier;
   b. a high power amplifier having greater output power capability than said low power amplifier:
   c. input means for receiving input signals;
   d. signal output means connected to receive output signals from said high power amplifier and said low power amplifier; and
   e. means for continuously conveying input signals from said input means to said high and low power amplifiers said conveying means including means for providing a higher gain path to said low power amplifier, so that for small signals said low power amplifier provides most of the output power from said composite amplifier circuit, and so that for large signals said high power amplifier provides a portion of the output power from said composite amplifier circuit.

2. A composite power amplifier circuit according to claim 1 further including feedback means associated with said signal output means and said input means, for conveying feedback signals indicative of said output signals to said input means.

3. A composite power amplifier circuit according to claim 2 wherein said input means includes a preamplifier connected to receive said input signals and said feedback signals.

4. A composite power amplifier circuit according to claim 1 wherein said signal output means includes an electrical impedence element connected to receive output signals from said low power amplifier.

5. A high efficiency multi-sectioned amplifier comprising:
   a. input means for receiving input signals;
   b. a first amplifier circuit adapted to be connected to a high voltage power supply;
   c. a second amplifier circuit adapted to be connected to a low voltage power supply having a supply voltage of smaller absolute value than the supply voltage of the high voltage power supply;
   d. means connected for conveying said input signals from said input means to said first amplifier circuit;
   e. a coupling amplifier circuit having an input connected to said first amplifier circuit for receiving said input signals therefrom, and an output connected to said second amplifier circuit, said coupling amplifier circuit being operable to supply amplified input signals to said second amplifier circuit;
   f. signal output means connected to receive high voltage output signals from said first amplifier circuit; and
   g. isolation means connected to said second amplifier circuit and said signal output means for conveying low voltage output signals from said second amplifier circuit to said output means and for electrically isolating the output of said second amplifier circuit from the output of said first amplifier circuit.

6. The apparatus of claim 5 further including feedback means associated with said signal output means and said input means, said feedback means for conveying feedback signals indicative of the output of said high efficiency multi-sectioned amplifier to said input means.

7. The apparatus according to claim 6 wherein said input means includes a preamplifier circuit connected for receiving said input signals and said feedback signals.

8. The apparatus according to claim 7 wherein said feedback means includes a current sensing resistor associated with said signal output means.

9. The apparatus according to claim 7 wherein said feedback means includes means for sensing the voltage at said signal output means, and wherein said input means includes an input capacitor for characterizing the frequency response of said high efficiency multi-sectioned amplifier.

10. A high efficiency deflection amplifier for driving the deflection coil of a cathode ray tube, comprising:
   a. input means for receiving input signals;
   b. an output terminal adapted to be connected to said deflection coil;
   c. a high voltage amplifier including an output transistor having a collector circuit adapted for connection to high voltage power source, a base circuit connected for receiving input signals from said input means, and an emitter circuit connected for delivering high voltage output signals to said output terminal;
   d. a low voltage amplifier including an output transistor having a collector circuit adapted for connection to a low voltage power source having a supply voltage of lesser magnitude than the high voltage power source, a base circuit, and an emitter circuit;
   e. a coupling amplifier having an input connected to the collector circuit of said high voltage amplifier output transistor for receiving amplified input signals therefrom, said coupling amplifier having an output connected to the base circuit of said low voltage power amplifier output transistor, said coupling amplifier operable to deliver amplified input signals to said low power amplifier;

f. an inductive impedance element connecting said emitter circuit of said low power amplifier output transistor to said output terminal, whereby low voltage low frequency signals are primarily supplied by said low power amplifier section, while high voltage frequency components are supplied by said high power amplifier section; and g. feedback means connected to said input means and associated with said ouput terminal, said feedback means operable to supply feedback signals indicative of said output signals to said input means.

* * * * *